United States Patent [19]
Suda et al.

[11] Patent Number: 5,129,567

[45] Date of Patent: * Jul. 14, 1992

[54] METHOD AND APPARATUS FOR CUTTING AN OPTICAL FIBER

[75] Inventors: Hirohisa Suda; Katsumi Sasaki, both of Sakura; Yasukuni Osato, Narashino, all of Japan

[73] Assignee: Fujikura Ltd., Tokyo, Japan

[*] Notice: The portion of the term of this patent subsequent to Jun. 18, 2008 has been disclaimed.

[21] Appl. No.: 606,103

[22] Filed: Oct. 31, 1990

Related U.S. Application Data

[63] Continuation of Ser. No. 174,072, Mar. 28, 1988, Pat. No. 5,024,363.

[30] Foreign Application Priority Data

Jun. 16, 1987 [JP] Japan ............... 62-92322[U]
Oct. 24, 1987 [JP] Japan ............... 62-163028[U]
Oct. 24, 1987 [JP] Japan ............... 62-268727
Nov. 11, 1987 [JP] Japan ............... 62-284844

[51] Int. Cl.⁵ ............................ C03B 37/16
[52] U.S. Cl. ................... 225/96.5; 225/105
[58] Field of Search ........... 225/2, 96, 96.5, 97, 225/105

[56] References Cited

U.S. PATENT DOCUMENTS

| | | |
|---|---|---|
| 3,934,773 | 1/1976 | Chinnock et al. |
| 4,118,862 | 10/1978 | Hensel |
| 4,202,475 | 5/1980 | Hirai et al. |
| 4,377,250 | 3/1983 | Muerkl |
| 4,418,855 | 12/1983 | LaMarche |
| 4,463,886 | 8/1984 | Thornton |
| 4,565,310 | 1/1986 | Krause |
| 4,619,387 | 10/1986 | Shank et al. |
| 4,621,754 | 11/1986 | Long et al. ........... 225/2 X |
| 4,715,876 | 12/1987 | Osaka et al. |

FOREIGN PATENT DOCUMENTS

| | | |
|---|---|---|
| 0082897 | 7/1983 | European Pat. Off. |
| 0129135 | 12/1984 | European Pat. Off. |
| 0211221 | 2/1987 | European Pat. Off. |
| 184207 | 9/1985 | Japan |
| 60-184207 | 9/1985 | Japan |
| 2034069 | 5/1980 | United Kingdom |
| 2046242 | 11/1980 | United Kingdom |
| 2134101 | 8/1984 | United Kingdom |

OTHER PUBLICATIONS

"Optical Fiber End Preparation for Low-Loss Splices", Globe et al., The Bell System Technical Journal, vol. 52, No. 9, Nov. 1973.

"The Automatic Splicing Machine Employing Electric Arc Fusion", Sakamoto et al., publisher and publication date unknown.

*Primary Examiner*—Frank T. Yost
*Attorney, Agent, or Firm*—Frishauf, Holtz, Goodman & Woodward

[57] ABSTRACT

The optical fiber cutting apparatus are constituted by a combination of a cutting apparatus body in which two clamps and, a scoring blade and a pushing member are provided on predetermined positions on a base and a set table having a guide groove on its top is provided at the rear of these clamps and, and plural types of adapters, in which first guides and second guides having different sizes and shapes in accordance with the sizes and shapes of single core optical fibers in use are mounted on respective plates that can detachably be fit in the guide groove. With the above design, the desired adapter having the proper guides and can be selected and used in accordance with the size and shape of a single core fiber in use, so that the cutting apparatus can be applied to optical fibers with different sizes and shapes.

8 Claims, 19 Drawing Sheets

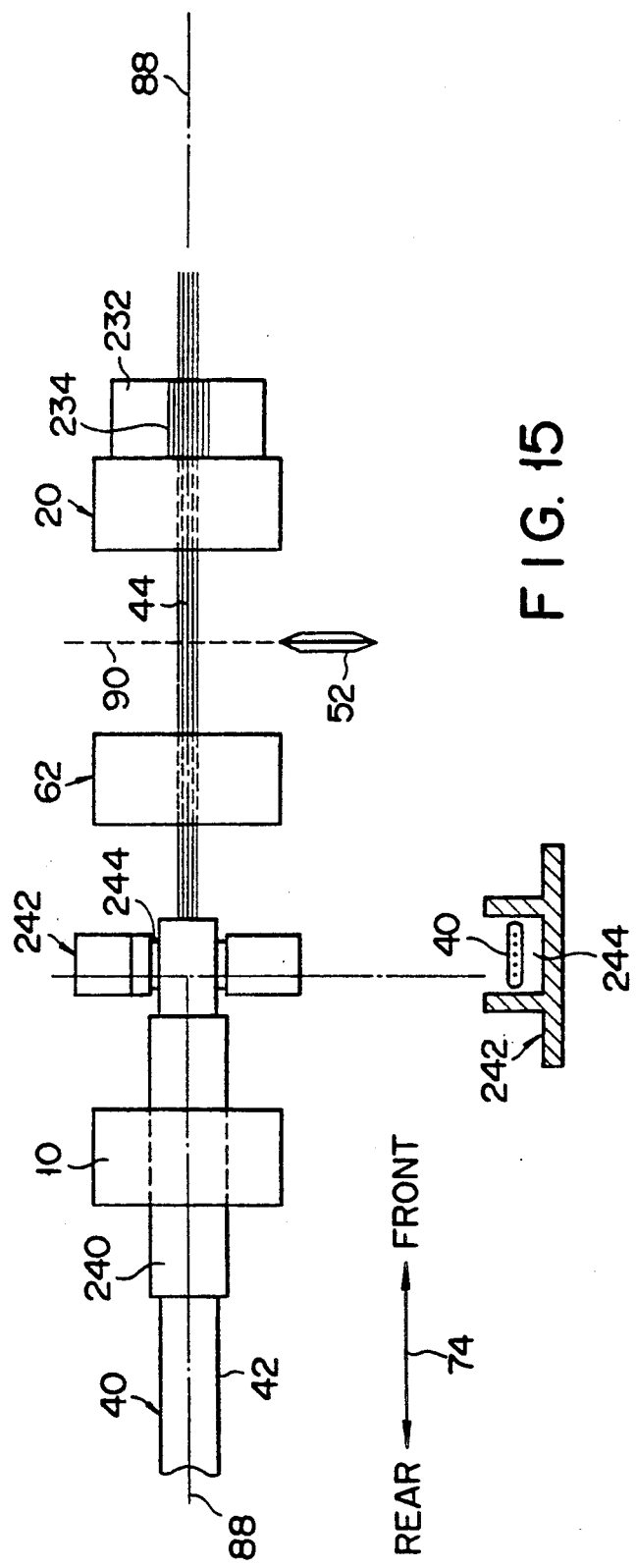

METHOD AND APPARATUS FOR CUTTING AN OPTICAL FIBER

This is a continuation of application Ser. No. 07/174,072 filed Mar. 28, 1988 now U.S. Pat. No. 5,024,363.

BACKGROUND OF THE INVENTION

1. Field of the Invention

The present invention relates to a method and an apparatus for cutting an optical fiber.

2. Description of the Related Art

In order to properly join a pair of optical fibers, it is necessary that the surface of the connecting end of each fiber be flat and perpendicular to the fiber's axis. To provide such an end face, the distal end of each optical fiber needs to be properly cut prior to splicing the fibers. Conventionally, this fiber cutting has been done using a fiber cutting apparatus as shown in FIGS. 1A to 1C.

FIG. 1A illustrates an example of a conventional optical fiber cutting apparatus applicable to single core fibers.

Reference numeral 10 denotes a first clamp, which comprises a clamp table 12 and a pincher 14.

Pincher 14 is freely openable and closable to clamp table 12, and, when closed, it clamps a sheathed portion 42 of an optical fiber 40.

Reference numeral 16 denotes a rubber member used to absorb the stress applied on sheathed portion 42 by pincher 14.

In FIGS. 1A-1C, pincher 14 is illustrated to move vertically with respect to clamp table 12. Actually, however, pincher 14 is often attached to clamp table 12 by means of a hinge 18 so as to be rockable to the clamp table, as shown in FIG. 2. The former design of first clamp 10 (see FIGS. 1A-1C) is the same as the latter design (FIG. 2) in principle and is easier to see its operation. In this respect, therefore, a second clamp 20 is also illustrated in the same manner so that its pincher 24 is shown to move vertically with respect to a clamp table 22.

Second clamp 20 comprises clamp table 22 and pincher 24. Pincher 24 is freely openable and closable to clamp table 22, and, when closed, it clamps an unsheathed or bare portion 44 (i.e., glass portion) of an optical fiber 40.

Reference numeral 26 denotes a rubber member used to absorb the stress applied on glass portion 44 by pincher 24.

Reference numeral 50 is a base for supporting clamp tables 12 and 22. Reference numeral 52 is a scoring blade provided between first clamp 10 and second clamp 20, which moves within a plane perpendicular to the axis of optical fiber 40 in the horizontal or arched direction and scores the optical fiber at the desired portion.

Reference numeral 54 is a pushing member which applies bending stress on the scored optical-fiber 40 from the opposite side of the score to cut the fiber.

To clamp optical fiber 40, first, optical fiber 40 is placed on clamp tables 12 and 22, as shown in FIG. 1A, then first clamp 10 is closed (FIG. 1B), and finally, second clamp 20 is closed (FIG. 1C). Thereafter, scoring blade 52 is moved within a plane perpendicular to the axis of optical fiber 40 in the horizontal direction or the arched direction, to score the optical fiber at the desired portion. Then, pushing member 54 applies bending stress on the scored optical fiber 40 from the opposite side of the score to cut the fiber.

As the pinchers of the individual clamps are sequentially closed, thus increasing the number of the clamping procedures, (1) the overall clamping operation is troublesome. And this operation would become more troublesome as the number of the clamps in use increases. (2) If wrong procedures are taken to close the clamps, it may twist or deform optical fiber 40.

The conventional cutting apparatus further has the following shortcoming. FIG. 3 illustrates the cutting apparatus, applied to a single core fiber, in a different aspect. In FIG. 3, the same reference numerals as are used in FIGS. 1A-1C are also used to specify the corresponding sections, thus omitting their otherwise redundant explanation.

Reference numeral 62 is a third clamp.

Scoring blade 52 is provided between second clamp 20 and third clamp 62 and is movable in the horizontal direction or in the arched direction, to score bare fiber 44 at the desired portion.

To prepare an end face perpendicular to the axis of optical fiber 40, the score on the optical fiber should also be perpendicular to the fiber axis 88.

To achieve this, optical fiber 40 needs to be clamped perpendicular to the moving direction 90 of scoring blade 52. However, sheathed portion 42 of optical fiber 40 is normally rolled and naturally curvy, so that the optical fiber even clamped may not be held straight as shown in FIG. 3. Therefore, the moving direction of scoring blade 52 is not perpendicular to the axis 88 of optical fiber 40 and the score would not be perpendicular to the fiber axis accordingly.

The conventional cutting apparatus further has the following shortcoming. FIG. 4 illustrates the cutting apparatus, applied to a single core fiber, in another aspect. In FIGS. 4, 5A and 5B, the same reference numerals as are used in the previously-described diagrams are also used to specify the corresponding sections, thus omitting their otherwise redundant explanation.

Third clamp 62 comprises a clamp table 64 and pincher 66. Pincher 66 is freely openable and closable to clamp table 64, and, when closed, it clamps bare portion (i.e., glass portion) 44 of an optical fiber 40. Reference numeral 36 is a rubber member used to absorb the stress applied on glass portion 44 by pincher 66.

Scoring blade 52 is moved in the horizontal direction or in the arched direction, to score bare fiber 44 at the desired portion, and then pushing member 54 is pressed against bare fiber 44, the fiber is cut (FIG. 5A). Pushing member 54 is then retracted (FIG. 5B), releasing the stress on the cut portions of bare fiber 44, so that the cut end of the fiber 44 and the end of a waste bare fiber 44A are likely to hit against each other. This may chip off or make a crack on the end face of bare fiber 44.

The conventional cutting apparatus further has the following shortcoming. FIGS. 6 and 7 illustrate the cutting apparatus, applied to a single core fiber, in a still different aspect. In FIGS. 6 and 7, the same reference numerals as are used in the previously-described diagrams are also used to specify the corresponding sections, thus omitting their otherwise redundant explanation.

Reference numeral 92 is a base of the overall cutting apparatus, and numeral 94 is a set table.

In the case where the diameter of the sheathed portion of the optical fiber is relatively large, and the optical fiber has a single core and needs a constant cutting length L, as shown in FIGS. 6 and 7, sheathed portion 42 is stopped at the boundary between groove 82 and slit 84 of guide 80 so that the cutting length L becomes constant.

On the other hand, if the diameter of the sheathed portion is relatively small (about 0.25 mmφ) and the cutting length L varies (see FIG. 8), sheathed portion 42 does not have a tendency to be curvy so that groove 82 is sufficient and it is unnecessary to form slit 84 in second guide 80. Sheathed portion 42 can freely be move within grooves 76 and 82.

Reference numeral 96 is a scale on which the end face of the fiber to be cut is aligned so as to determine the cutting length L.

When this cutting apparatus is applied to cutting a multicore fiber, a stationary jig is mounted to optical fiber 40.

As should be apparent from the above explanation given with reference to FIGS. 6-9, different types of cutting apparatuses should be conventionally provided depending on the types and uses of optical fibers to be cut and variation in the cutting length.

SUMMARY OF THE INVENTION

It is therefore an object of this invention to provide an optical fiber cutting apparatus, in which the number of the procedures for clamping the optical fiber is decreased, and the clamping operation is simplified.

Another object of the invention is to provide an optical fiber cutting apparatus, in which the fiber is cut in a direction perpendicular to the axis thereof even if the fiber is curvy.

A further object of the present invention is to provide an optical fiber cutting apparatus, in which the cut ends of the fiber are prevented from being hitting after the cutting of the fiber.

A still further object of the present invention is to provide an optical fiber cutting apparatus which can be applied to different types of the optical fibers.

A yet further object of the present invention is to provide a method of cutting an optical fiber, in which the cut ends of the fiber are prevented from being hitting after the cutting of the fiber.

According to an aspect of this invention, there is provided an optical fiber cutting apparatus which comprises:

a plurality of clamps for clamping an optical fiber set straight, each of the clamps comprising a pincher and a table, the pinchers of predetermined two adjacent clamps of the plurality of clamps being formed integrally;

a scoring blade, provided between the predetermined two adjacent clamps, for making a score on the optical fiber by moving within a plane substantially perpendicular to the optical fiber; and a pushing member for pushing the optical fiber from an opposite side of the score to cut the optical fiber.

According to a different aspect of this invention, there is further provided an optical fiber cutting apparatus which comprises:

a plurality of clamps for clamping an optical fiber set straight, each of the clamps comprising a pincher and a table;

a scoring blade, provided between predetermined two adjacent clamps of the plurality of clamps, for making a score on the optical fiber by moving within a plane substantially perpendicular to the optical fiber;

a pushing member for pushing the optical fiber from an opposite side of the score to cut the optical fiber; and at least one reference straight line means provided at a location under the optical fiber to be clamped by the clamps, in a direction substantially perpendicular to a moving direction of the scoring blade.

According to a further aspect of this invention, there is provided an optical fiber cutting apparatus which comprises:

a plurality of clamps for clamping an optical fiber set straight, each of the clamps comprising a pincher and a table;

a scoring blade, provided between predetermined two adjacent clamps of the plurality of clamps, for making a score on the optical fiber by moving within a plane substantially perpendicular to the optical fiber; and a pushing member for pushing the optical fiber from an opposite side of the score to cut the optical fiber, the pushing member being retracted after the optical fiber cut by the pushing member is rendered movable by releasing the predetermined two adjacent clamps while the optical fiber is still being bent by the pushing member.

According to another aspect of this invention, there is further provided an optical fiber cutting apparatus comprising;

a main body comprising a plurality of clamps for clamping an optical fiber set straight, a scoring blade, provided between predetermined two adjacent clamps of said plurality of clamps, for making a score on said optical fiber, a pushing member for pushing said optical fiber from an opposite side of said score to cut said optical fiber, a base on which said plurality of clamps, said scoring blade and said pushing member are provided at predetermined positions, and a set table provided on a straight alignment line of said plurality of clamps on a side of an outermost one of said plurality of clamps and having a guide groove formed on a top surface thereof; and an adapter comprising a plate having first and second guides formed in accordance with a type of an optical fiber to be cut, and detachably fitable in said guide groove.

According to a still further aspect of this invention, there is further provided an optical fiber cutting apparatus comprising;

a main body comprising a plurality of clamps for clamping an optical fiber set straight, a scoring blade, provided between predetermined two adjacent clamps of said plurality of clamps, for making a score on said optical fiber, a pushing member for pushing said optical fiber from an opposite side of said score to cut said optical fiber, a base on which said plurality of clamps, said scoring blade and said pushing member are provided at predetermined positions, and a set table provided on a straight alignment line of said plurality of clamps on a side of an outermost one of said plurality of clamps and having a guide groove formed on a top surface thereof;

an adapter comprising a plate having first and second guides formed in accordance with a type of an optical fiber to be cut, and detachably fitable in said guide groove; and a stationary jig comprising a plate and a lid, for securing a multicore optical fiber therebetween, the sizes of said plate of said adapter and said plate of said stationary jig being substantially equal.

According to a still further aspect of this invention, there is further provided a method for cutting an optical fiber comprising the steps of:

causing a plurality of clamps to clamp an optical fiber set straight;

moving a scoring blade between predetermined two adjacent clamps of the plurality of clamps to make a score on the optical fiber;

causing a pushing member to push the optical fiber from an opposite side of the score to cut the optical fiber; and retracting the pushing member after the optical fiber cut by the pushing member is rendered movable by releasing the predetermined two adjacent clamps while the optical fiber is still being bent by the pushing member.

BRIEF DESCRIPTION OF THE DRAWINGS

FIG. 15 is a schematic plan view of an optical fiber cutting apparatus according to a still another embodiment of this invention;

DETAILED DESCRIPTION OF THE PREFERRED EMBODIMENTS

Figure 1A:
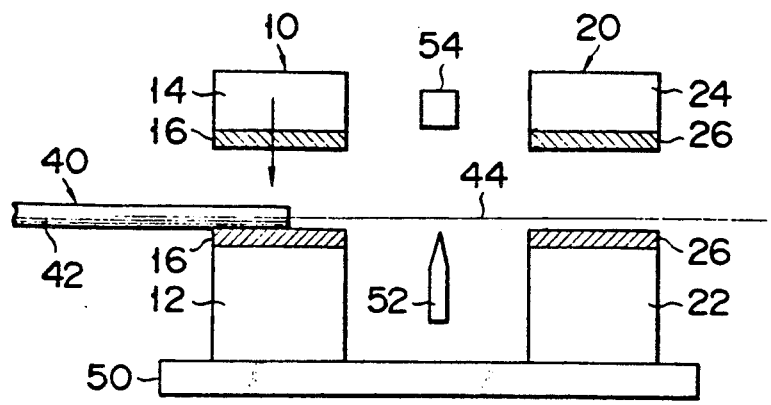
FIGS. 1A to 1C respectively show schematic side views of a conventional optical fiber cutting apparatus.

Embodiments of this invention will be explained below with reference to the accompanying drawings. In the following description of the embodiments, the same reference numerals are used to specify corresponding portions of the conventional cutting apparatuses and the cutting apparatuses according to the embodiments for the ease of understanding.

Figure 10A:
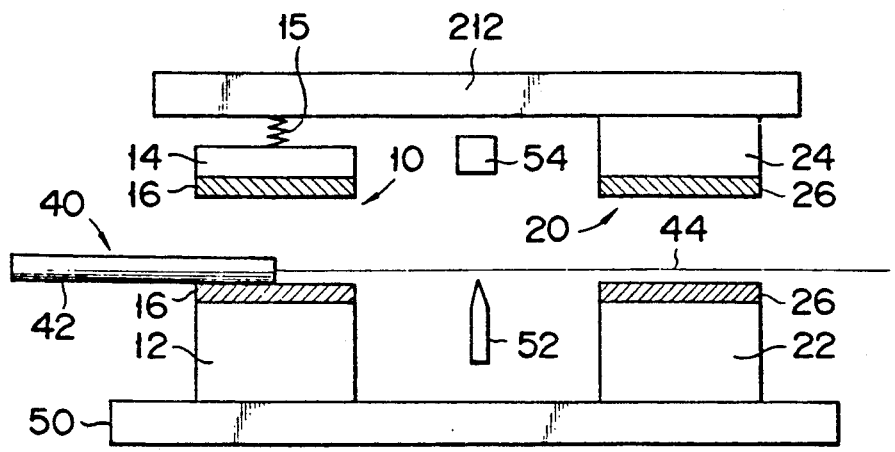
FIGS. 10A and 10B are schematic side views of an optical fiber cutting apparatus according to an embodiment of this invention.
Figure 10B:
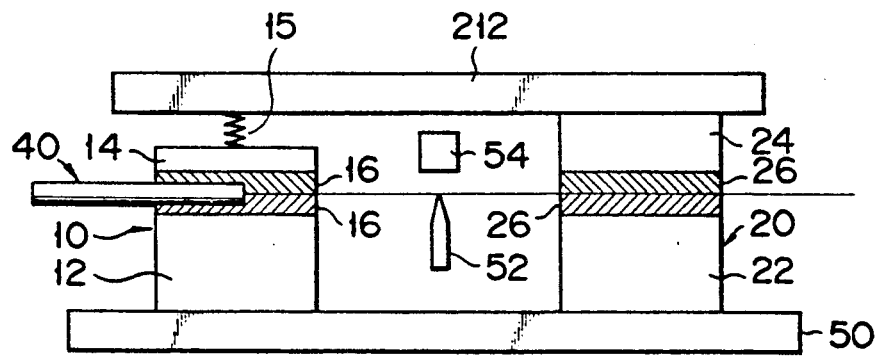

FIGS. 10A and 10B schematically illustrate an optical fiber cutting apparatus according to an embodiment of this invention.

Reference numeral 10 denotes a first clamp, which comprises a clamp table 12 and a pincher 14.

Pincher 14 is freely openable and closable to clamp table 12, and, when closed, it clamps a sheathed portion 42 of an optical fiber 40.

Reference numeral 16 denotes a rubber member used to absorb the stress applied on sheathed portion 42 by pincher 14.

In FIGS. 10A and 10B, pincher 14 is illustrated to move vertically with respect to clamp table 12. Actually, however, pincher 14 is attached to clamp table 12 by means of a hinge (not shown) so as to be rockable to the clamp table. The former design of first clamp 10 (see FIGS. 10A and 10B) is the same as the latter design in principle and is easier to see its operation. In this respect, therefore, a second clamp 24 is also illustrated in the same manner so that its pincher 24 is shown to move vertically with respect to a clamp table 22.

Second clamp 20 comprises clamp table 22 and pincher 24. Pincher 24 is freely openable and closable to clamp table 22, and, when closed, it clamps an unsheathed or bare portion 44 (i.e., glass portion) of an optical fiber 40.

Reference numeral 26 denotes a rubber member used to absorb the stress applied on glass portion 44 by pincher 24.

Reference numeral 50 is a base for supporting clamp tables 12 and 22. Reference numeral 52 is a scoring blade provided between first clamp 10 and second clamp 20, which moves within a plane perpendicular to the axis of optical fiber 40 in the horizontal direction or the arched direction and scores the optical fiber at the desired portion.

Reference numeral 54 is a pushing member which applies bending stress on the scored optical fiber 40 from the opposite side of the score to cut the fiber.

Figure 1B:
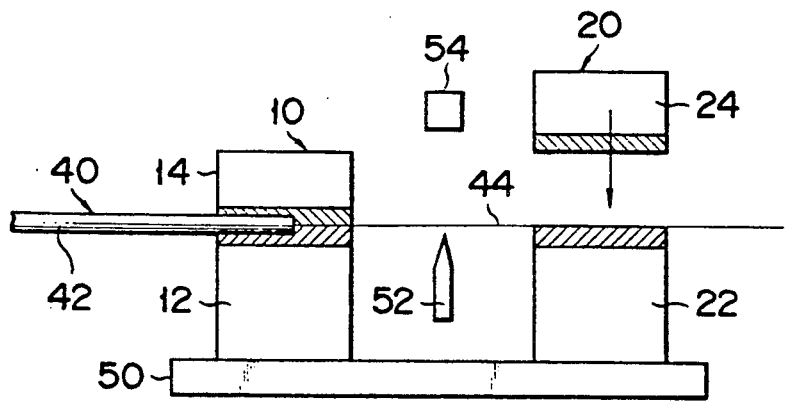
Figure 1C:
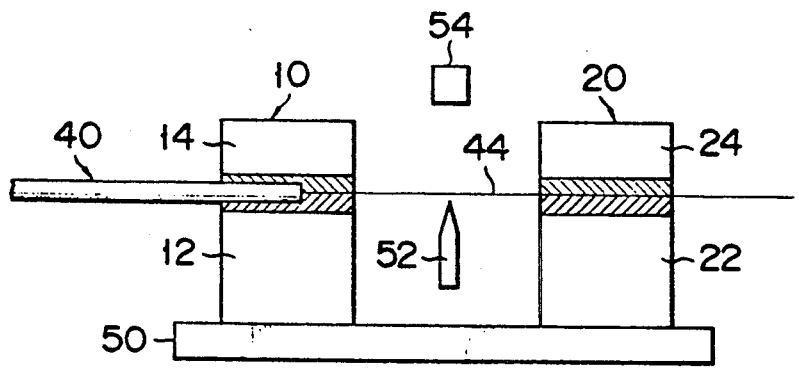
Figure 2:
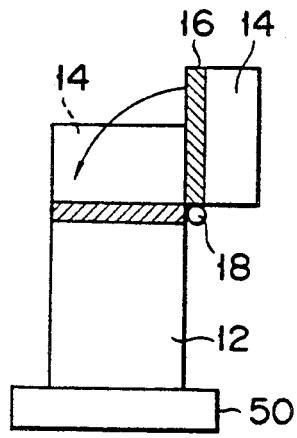
FIG. 2 shows a schematic side view of a clamp in the conventional cutting apparatus of FIGS. 1A to 1C.
Figure 3:
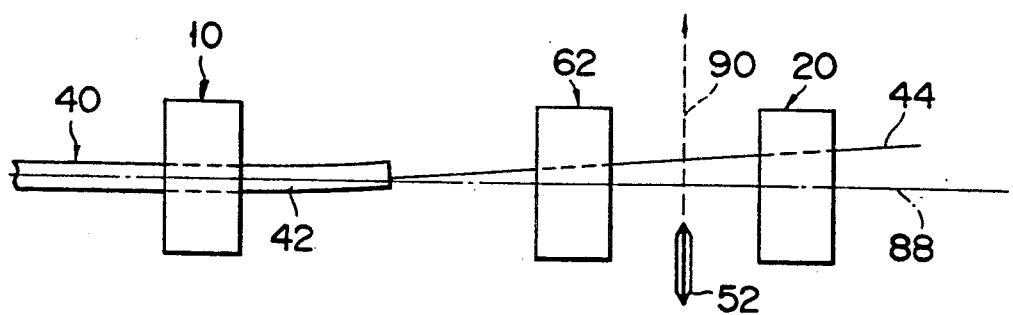
FIG. 3 shows a schematic plan view of the conventional cutting apparatus to which a curvy optical fiber is applied.
Figure 4:
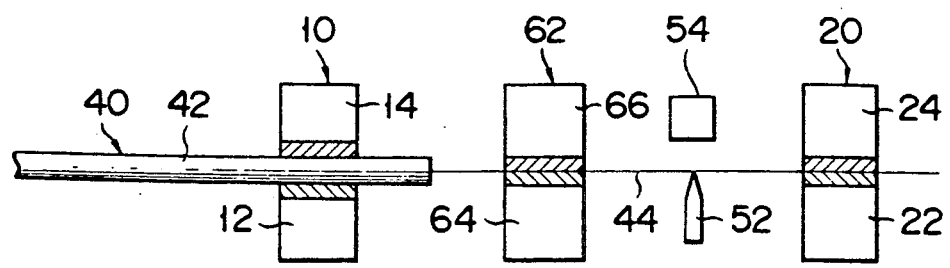
FIG. 4 shows a schematic plan view of the conventional cutting apparatus in which the cutting blade scores a fiber.
Figure 5A:
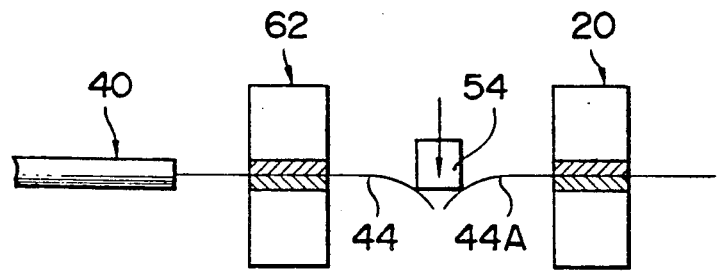
FIGS. 5A and 5B respectively show schematic plan views of the conventional cutting apparatus in which the fiber is pushed by the pushing member.
Figure 5B:
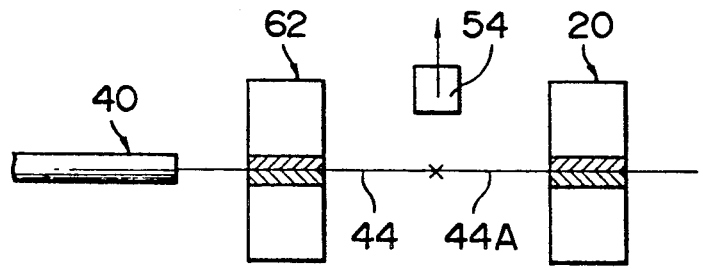

Pincher 14 of clamp 10 is attached to a plate 212 by means of a spring 15, while pincher 24 of clamp 20 is directly mounted on plate 212. Pinchers 14 and 24 move integrally. That is, the cutting apparatus of this embodiment is designed such that pinchers 14 and 24 of clamps 10 and 20 provided on the respective sides of the fiber cutting section are made integral by plate 212. This is the difference between the cutting apparatus of this embodiment and the conventional cutting apparatus as shown in FIGS. 1A-1C.

Operation:

In the first step of cutting optical fiber 40, first clamp 10 and second clamp 20 are released and optical fiber 40 is placed on clamp tables 12 and 22, as shown in FIG. 10A.

Then, as shown in FIG. 10B, pinchers 14 and 24 made integral by plate 212 are simultaneously closed to clamp optical fiber 40 at the same time.

Thereafter, scoring blade 52 is moved within a plane perpendicular to the axis of optical fiber 40 in the horizontal direction or the arched direction, to score the optical fiber at the desired portion.

Then, pushing member 54 applies bending stress on the scored optical fiber 40 from the opposite side of the score to cut the fiber.

Figure 11A:
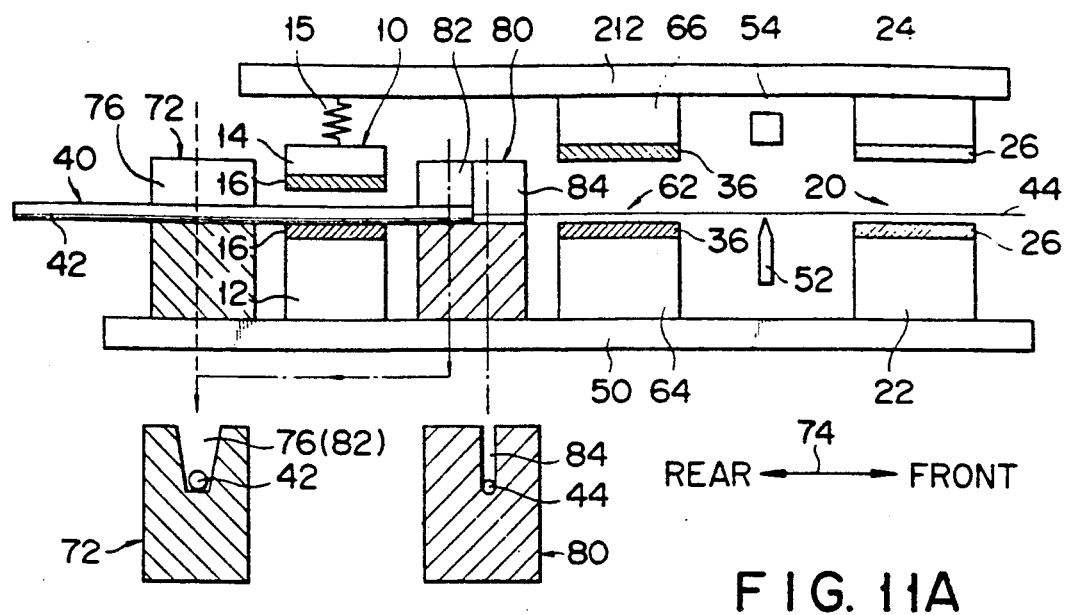
FIGS. 11A to 11C are schematic side views of an optical fiber cutting apparatus according to another embodiment of this invention.
Figure 11B:
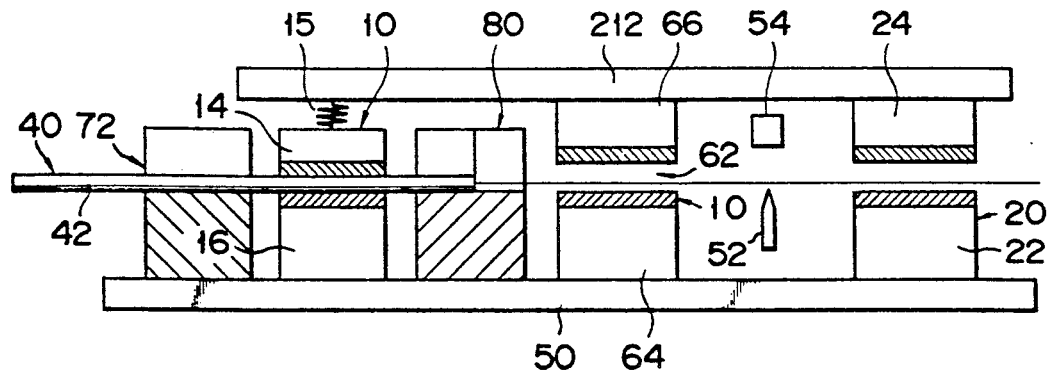
Figure 11C:
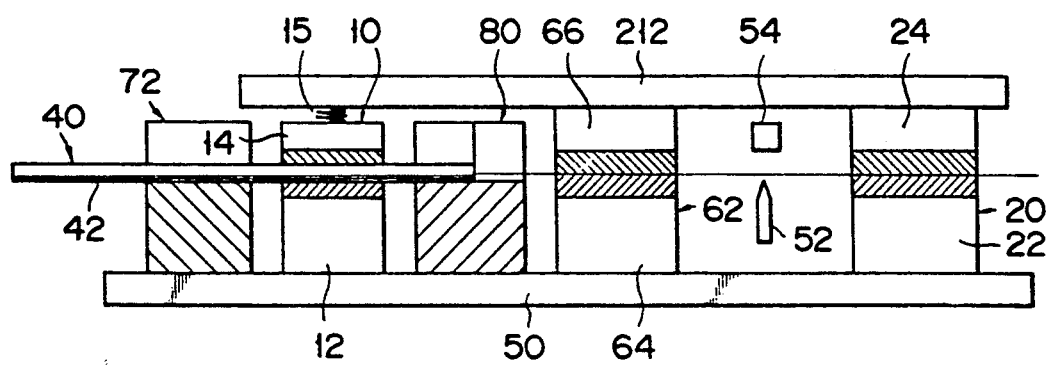

FIGS. 11A to 11C illustrate another embodiment which further has a third clamp 62 in addition to first and second clamps 10 and 20, and first fiber guide 72 and second fiber guide 80.

Third clamp 62 comprises a clamp table 64 and pincher 66. Pincher 66 is freely openable and closable to clamp table 64, and, when closed, it clamps bare portion 44 of an optical fiber 40. Reference numeral 36 is a rubber member used to absorb the stress applied on glass portion 44 by pincher 66.

In FIGS. 11A to 11C, all clamps 10, 20 and 62 are integrally formed. However, clamp 10 may be separate from clamps 20 and 62 which sandwich the fiber portion to be cut.

Reference numeral 72 is a first guide, which is provided on the rear side (on the side of sheathed portion 42) of first clamp 10 (see the arrow 74 in FIG. 11A for the rear and front side) and has a groove 76 provided to receive sheathed portion 42, as shown in the lower left cross section in FIG. 11A.

Reference numeral 80 is a second guide provided on the front side (on the side of bare fiber 44) of first clamp 10, and the second guide 80 has a groove 82 provided to receive sheathed portion 42 and a slit 84 to receive bare fiber 44, as shown in the lower left and right cross sections in FIG. 11A. The groove 82 and slit 84 are formed to be continuous to each other.

The cutting apparatus of FIGS. 11A to 11C may be applied to cutting a taped multicore fiber. In this case, a stationary jig is attached to optical fiber 40 and is clamped by first clamp 10, and scoring blade 52 is moved horizontally in a plane perpendicular to the axis of the fiber, to score the bare fiber portion.

Operation:

Optical fiber 40 is set such that its sheathed portion 42 is fit in groove 76 of guide 72 and groove 82 of guide 80 and its glass portion 44 is fit in slit 84 of guide 80.

Then, plate 212 is moved downward, thus causing pincher 14 of first clamp 10 to contact sheathed potion 42 of optical fiber 40 to thereby clamp the fiber in the direction perpendicular to the moving direction of scoring blade 52.

Plate 212 is moved further down, causing second and third clamps 20 and 66 to simultaneously clamp optical fiber 40. Consequently, optical fiber 40 can be properly scored by scoring blade 52.

Each of the first and second embodiments can be applied to both of single core and multicore optical fibers.

Effects of the Aforementioned Embodiments:

Since the pinchers of at least the clamps located on the respective sides of the optical fiber cutting section are formed integrally, the following effects are obtained.

(1) The optical fiber can be clamped by a single operation, thus improving the operability.

(2) A single opening/closing mechanism (such as a hinge) is sufficient for those two or three clamps, thus ensuring that the clamp structure can be simplified and can be made more durable and more compact.

Figure 12A:
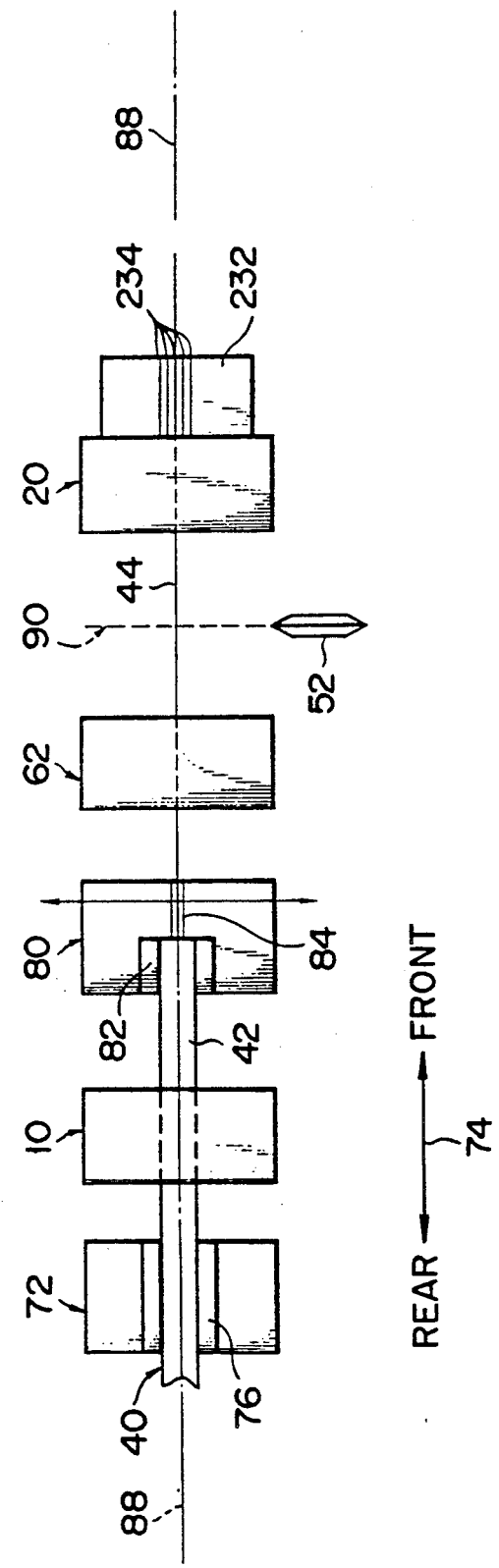
FIG. 12A is a schematic plan view of an optical fiber cutting apparatus according to a further embodiment of this invention.
Figure 12B:
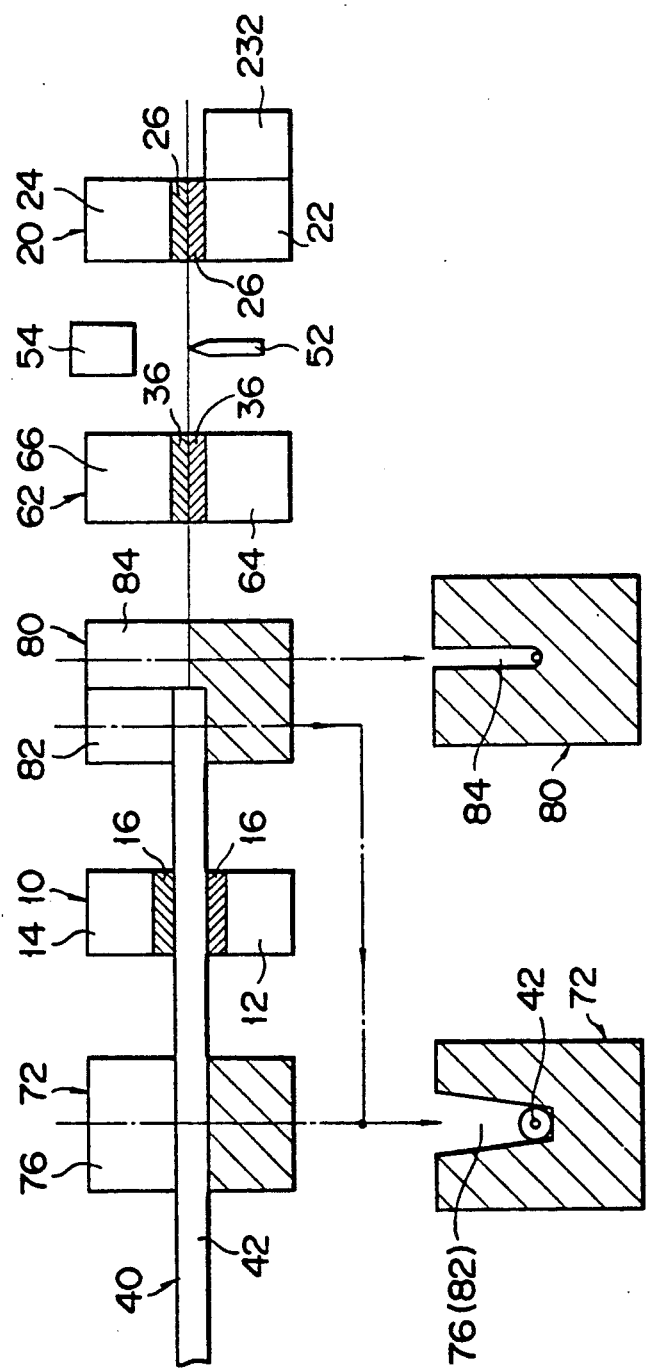
FIG. 12B is a cross section view taken along the center line of FIG. 12A.

FIGS. 12A and 12B illustrate an optical fiber cutting apparatus applied to cutting a single core fiber, according to a further embodiment of this invention. According to this embodiment, at least one reference straight line is provided in the direction perpendicular to the moving direction of the scoring blade 52, at the location on which the optical fiber is to be set and clamped for its proper alignment. Consequently, even though the optical fiber is curvy, the fiber can be properly set on a predetermined line.

Second clamp 20 may be integrated with third clamp 62. Alternatively, all clamps 10, 20 and 62 may be integrated with one another.

A plate 232 is provided on the front side of the foremost clamp 20 and has reference straight lines 234 provided on its top. As shown in FIG. 12B, the top of plate 232 is located lower than the top of table 22 of clamp 20.

The straight lines 234 are provided in parallel to the center line 88 or perpendicular to the moving direction 90 of scoring blade 52. The number of the straight lines is, for example, 5 (e.g., 1 mm intervals between the lines) and the center one of the straight lines is aligned with the center line 88.

Guide 80 is made horizontally movable within a plane perpendicular to the center line 88.

Operation:

Optical fiber 40 is set on the individual tables 12, 64 and 22 of the respective clamps 10, 62 and 20, and clamp 10 is first closed to clamp sheathed portion 42.

At this time, make sure that bare fiber 44 is parallel to the center one of reference straight lines 234.

If they are not parallel to one another, guide 80 is slightly moved to align bare fiber 44 with the center one of straight lines 234 (i.e., the center line 88).

Then, clamps 62 and 20 are closed sequentially or simultaneously.

Figure 13:
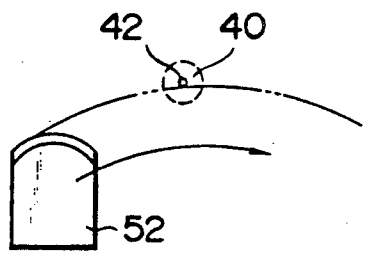
FIG. 13 is a schematic diagram illustrating a scoring blade used in the cutting apparatus as shown in FIGS. 12A and 12B.

Thereafter, scoring blade 52 is moved within a plane perpendicular to the axis of optical fiber 40 in the horizontal direction or the arched direction (FIG. 13), to score the optical fiber at the desired portion.

Figure 14:
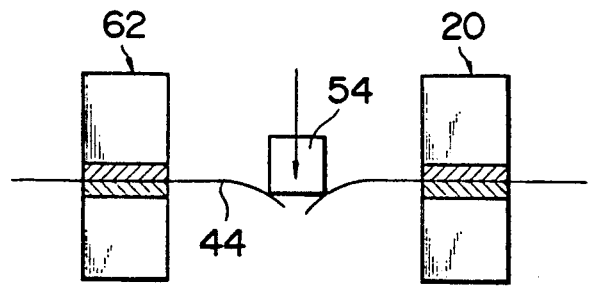
FIG. 14 is a schematic diagram illustrating that an optical fiber clamped by a pair of clamps is being cut by a pushing member.

Then, pushing member 54 applies bending stress on the scored optical fiber 40 from the opposite side of the score to cut the fiber (FIG. 14).

If the cutting apparatus as shown in FIGS. 12A and 12B is applied to cutting a multicore fiber, a correction guide 242 is provided at that portion slightly projecting from the distal end of stationary jig 240 toward bare fiber 44, as shown in FIG. 15. Guide 242 has a groove 244 for receiving sheathed portion 42, as shown in the lower cross sectional diagram in the figure, and is horizontally movable in the direction perpendicular to the center line 88.

Operation:

The operation for this apparatus is substantially the same as the aforementioned operation for cutting a single core fiber; to correct the alignment of the optical fiber with respect to the reference straight lines, however, guide 242 is moved.

Figure 16:
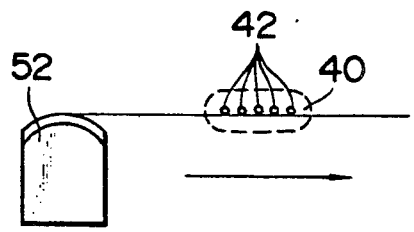
FIG. 16 is a schematic diagram of a scoring blade used in the cutting apparatus as shown in FIG. 15.

Effects of the Embodiment shown in FIGS. 12A and 12B:

Since at least one reference straight line 234 perpendicular to the moving direction 90 of scoring blade 52 is provided at a location on which the optical fiber is clamped, the optical fiber can be properly set on a predetermined line even if the fiber is curvy. This can ensure that the optical fiber can be scored in the direction perpendicular to the fiber axis. In this case, scoring blade 52 is moved horizontally as shown in FIG. 16.

FIGS. 17A to 17D illustrate the optical fiber and the clamps in the individual steps of an optical fiber cutting method according to another embodiment of this invention. This method can easily prevent a score or crack from being made on the end face as a result that the cut ends of the optical fiber contact or hit against each other when these ends revert to the initial positions at which they are cut.

Figure 17A:
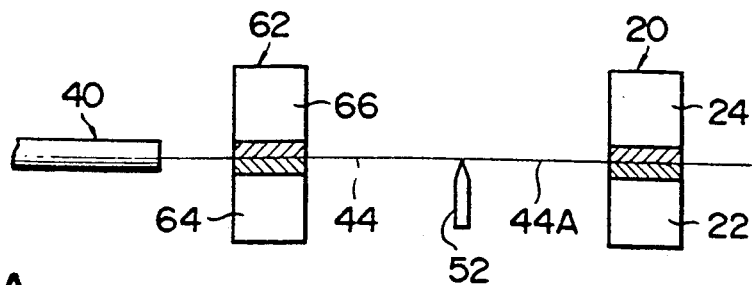
FIGS. 17A to 17D are schematic diagrams illustrating the states of the clamps and the fiber in the individual steps of an optical fiber cutting method according to another embodiment of this invention.

Scoring blade 52 is moved in the direction perpendicular to the axis of bare fiber 44 to the optical fiber score at the desired portion (FIG. 17A).

Figure 17B:
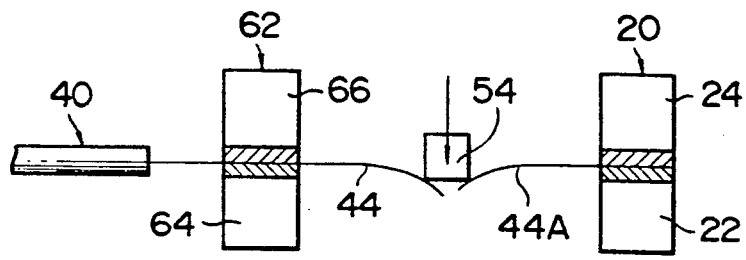

Then, pushing member 54 is moved to push the scored portion of the fiber from the opposite side of scoring blade 52 to cut the fiber (FIG. 17B).

While bare fiber 44 cut by the pressure of pushing member 54 is in the pushed state (FIG. 17C), clamps 62 and 20 on the respective sides of pushing member 54 are slightly released so as to permit the optical fiber to move.

Thereafter, pushing member 54 is retracted (FIG. 17D) to remove the optical fiber.

According to the cutting method of this embodiment, while the cut optical fiber is still pushed by the pushing member, the clamps on respective sides of the pushing member are slightly released so as to permit movement of the optical fiber, and the pushing member is then retracted to remove the optical fiber. Therefore, the following effects are attained.

(1) The end faces of the cut optical fiber do not strongly hit against each other, thus prevent a damage of the end face of the fiber to be used.

(2) This method can be easily executed irrespective of the location of the pushing member, i.e., irrespective of whether the pushing member is positioned above the optical fiber or at the side thereof.

The following explains a cutting apparatus for performing the above method.

Figure 18:
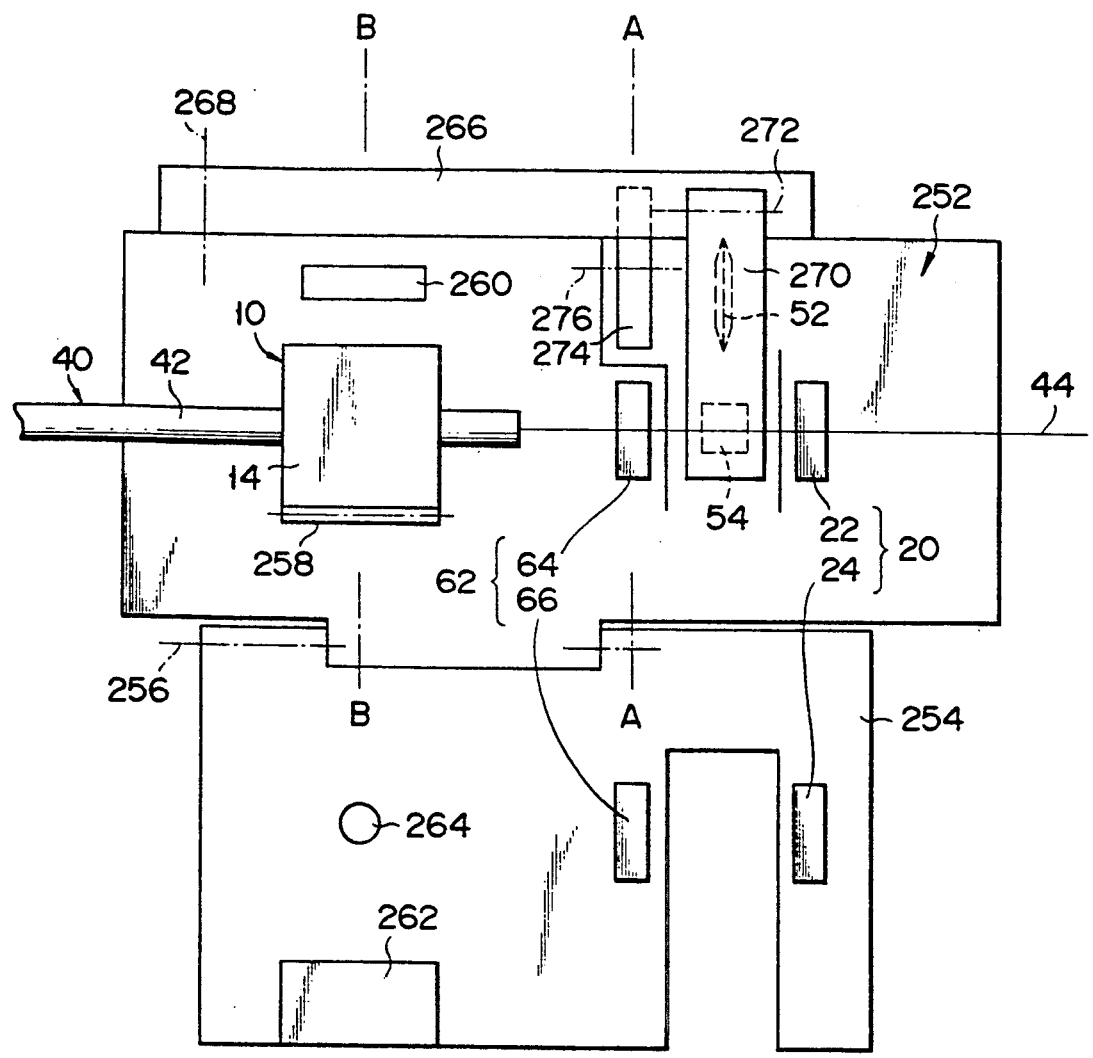
FIG. 18 is a schematic plan view of a cutting apparatus for executing the cutting method comprising the steps as shown in FIGS. 17A-17D.

In FIG. 18 which is a plan view of the cutting apparatus with its lid fully open, reference numeral 252 is a main body of the cutting apparatus, and numeral 254 is a lid made openable and closable by means of a hinge 256.

Figure 19A:
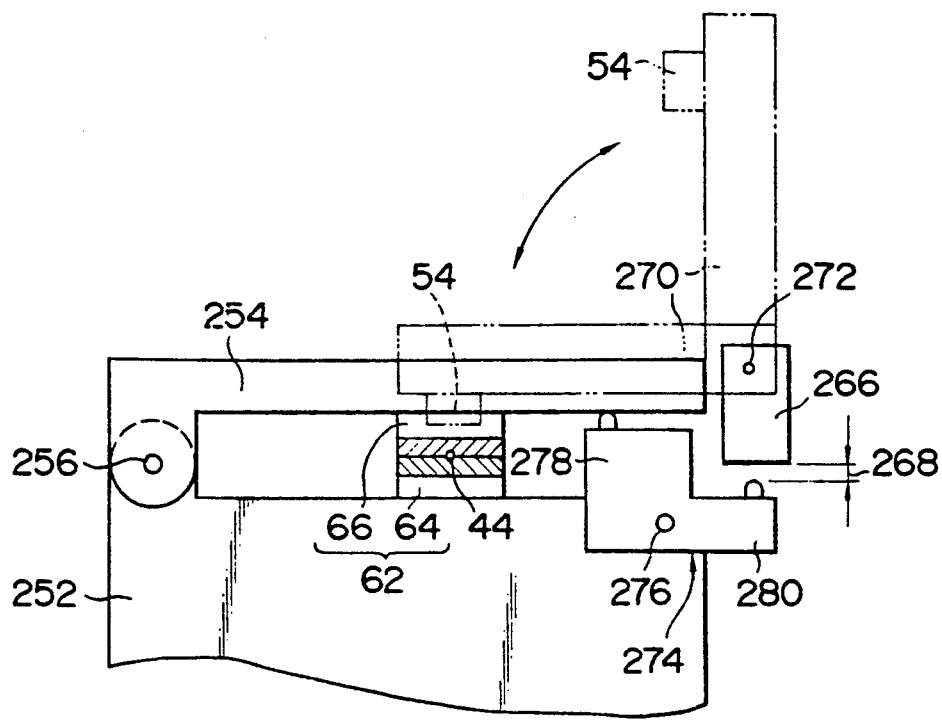
FIGS. 19A and 19B are cross sectional views of the cutting apparatus shown in FIG. 18 with its plate closed, as taken along lines A—A and B—B of FIG. 18, respectively.
Figure 19B:
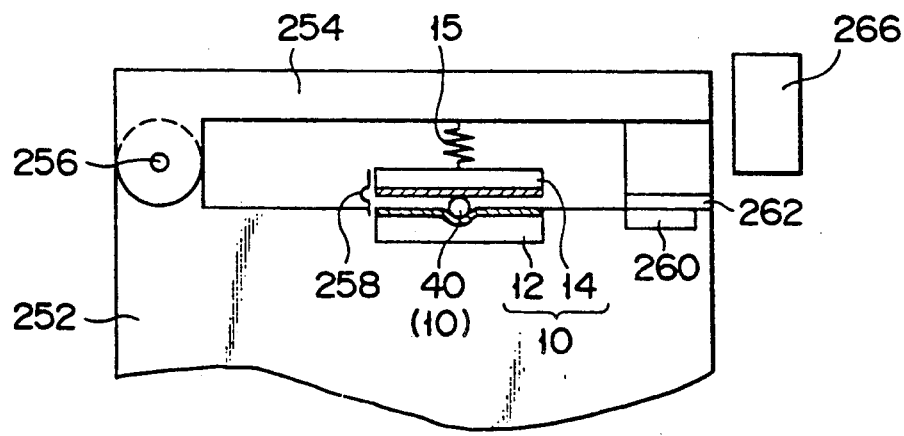
Figure 20A:
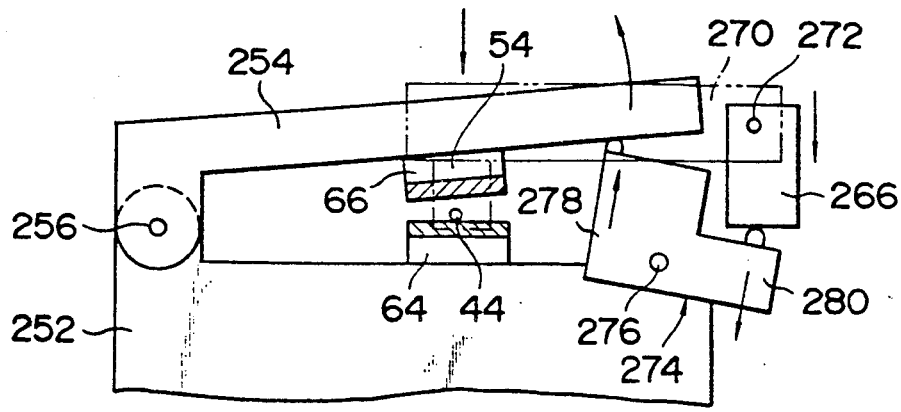
FIGS. 20A and 20B are cross sectional views of the cutting apparatus shown in FIG. 18 with its plate slightly opened, as taken along lines A—A and B—B of FIG. 18, respectively.
Figure 20B:
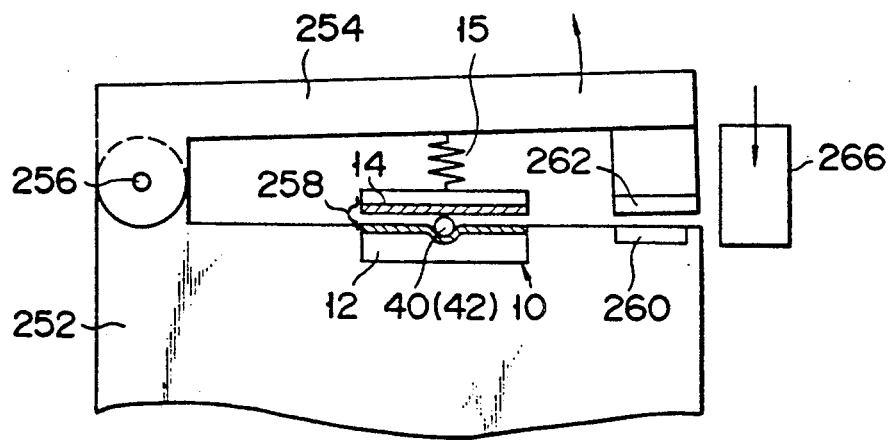

FIGS. 19A and 19B respectively illustrate the cross sections of the cutting apparatus with its lid 254 closed, taken along lines A—A and B—B of FIG. 18, while FIGS. 20A and 20B respectively illustrate the cross sections of the cutting apparatus with its lid 254 slightly open, taken along lines A—A and B—B of FIG. 18.

Tables 64 and 22 of clamps 62 and 20 are mounted on apparatus body 252 and pinchers 66 and 24 are attached to lid 254.

Table 12 of clamp 10 is mounted on apparatus body 252 and pincher 14 is attached to the apparatus body by means of a hinge 258 (FIG. 18).

Reference numeral 260 is a magnet, numeral 262 is a magnet-contact metal and numeral 264 is a compression spring.

When lid 254 is closed, clamping force is given to clamps 62 and 20 by the attraction between magnet 260 and contact metal 262.

The clamping force of first clamp 10 is given by the force of spring 15 in addition to the attraction between magnet 260 and contact metal 262.

Pushing member 54 is mounted as follows.

An arm 266 is swingably mounted on one side of apparatus body 252 by means of a support shaft 268 provided at the proximity of one end of the arm. Another arm 270 extending in the direction perpendicular to the axis of arm 266 is liftably mounted at the proximity of the other end of arm 266, and pushing member 54 is mounted on the bottom of the distal end of arm 270.

Scoring blade 52 is horizontally movable under arm 270.

Reference numeral 274 is a lever, which is swingably mounted on apparatus body 252 by means of a pin 276 and has one end section 278 contacting the bottom of lid 254 and the other end section 280 facing arm 266 with a slight gap 268 between end section 280 and the bottom of arm 266.

Operation:

After arm 270 is lifted up, lid 254 is opened and pincher 14 of clamp 10 is released, optical fiber 40 is set at a given position.

Pincher 14 is closed, lid 254 is closed and optical fiber 40 is clamped by clamps 10, 62 and 20.

Scoring blade 52 is moved in the direction perpendicular to the axis of fiber 40 to score bare fiber 44.

Arm 270 is lowered to push down pushing member 54, thereby cutting bare fiber 44 at the score.

At the time pushing member 54 is pushed down, arms 270 and 266 are simultaneously lowered. When arm 266 is lowered (FIG. 20A), its bottom contacts end section 280 of lever 274 to thereby lower the end section 280. As a result, the other end section 278 of lever 274 is moved up to lift up lid 254 against the attracting force of magnet 260, thereby slightly releasing clamps 62 and 20. Accordingly, bare fiber 44 and waste fiber 44A are permitted to be freely moved.

When lid 254 is slightly lifted up to separate magnet 260 from contact metal 262 a little, the magnetic force is reduced. Therefore, even the pushing of pushing member 54 is stopped, lid 254 is kept slightly open by the force of spring 15 (FIG. 20B) to thereby keep clamps 62 and 20 slightly open.

When pushing member 54 is retracted, bare fiber 44 and waste fiber 44A become straight due to their resilient force. Since clamps 62 and 20 are released at this time, bare fiber 44 does not hit against waste fiber 44A, thus preventing an undesirable score or crack from being made on the end face of the fiber. Even if bare fiber 44 and waste fiber 44A hit against each other, the collision is not strong enough (as bare fiber 44 and waste fiber 44A are not clamped at that time) to make any crucial damage.

Then, arm 270 is lifted up, lid 254 and pincher 14 are opened, and optical fiber 40 is removed.

The above cutting method is also applicable to the following case.

Figure 17C:
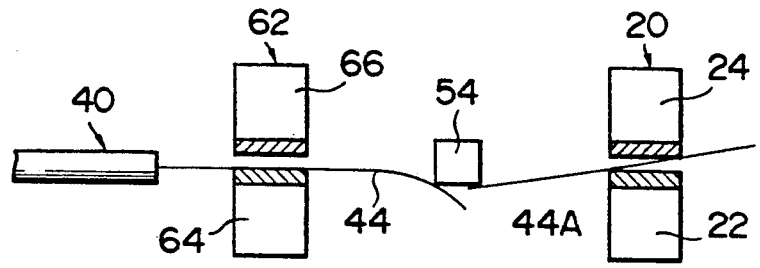
Figure 17D:
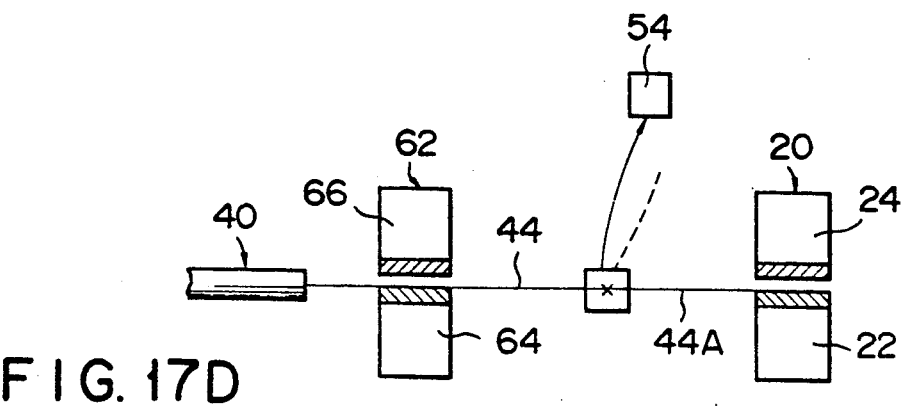

(1) Sheathed portion 42 is clamped by both of clamps 66 and 20 in the case shown in FIGS. 17A-17C, a score is made by scoring blade 52 to the sheathed portion, and the sheathed fiber is then cut at the score by pushing member 54.

(2) With sheathed portion 42 clamped by clamp 62 and bare fiber 44 clamped by clamp 20, the fiber is cut.

According to the cutting method of this embodiment, while the cut optical fiber is still pushed by the pushing member, the clamps on respective sides of the pushing member are slightly released so as to permit movement of the optical fiber, and the pushing member is then retracted to remove the optical fiber. Therefore, the following effects are attained.

(1) The end faces of the cut optical fiber do not strongly hit against each other, thus prevent a damage of the end face of the fiber to be used.

(2) This method can be easily executed irrespective of the location of the pushing member, i.e., irrespective of whether the pushing member is positioned above the optical fiber or at the side thereof.

Figure 21A:
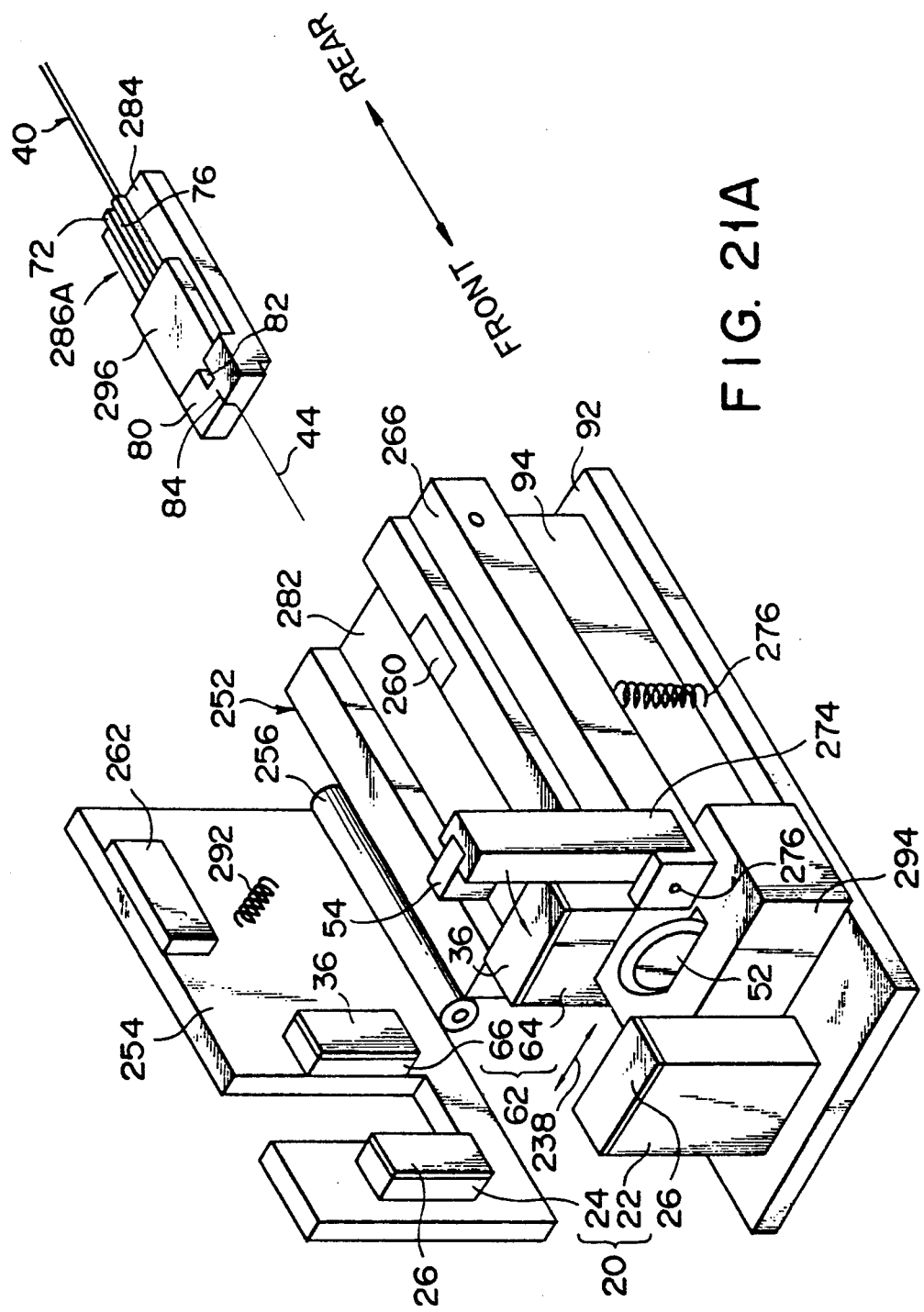
FIG. 21A is a schematic perspective view of an optical fiber cutting apparatus according to a still another embodiment of this invention.

FIG. 21A illustrates an optical fiber cutting apparatus according to a still another embodiment, which can be applied to cutting optical fibers with different sizes, types, cutting lengths, etc.

This cutting apparatus differs from the conventional cutting apparatus shown in FIGS. 1-9 in first guide 72, second guide 80 and the stationary jig. Clamps 66 and 20, scoring blade 52 and pushing member 54 are the same for both apparatuses.

According to this embodiment, as shown in FIG. 21A, the overall cutting apparatus are constituted by a combination of:

(1) cutting apparatus body 252 in which two clamps 66 and 20, scoring blade 52 and pushing member 54 are provided on predetermined positions on base 92 and set table 94 having guide groove 282 on its top is provided at the rear of these clamps 66 and 20, and (2) plural types of adapters 286A, 286B, . . . , in which first guides 72 and second guides 80 having different sizes and shapes in accordance with the sizes and shapes of single core optical fibers in use are mounted on respective plates 284 that can detachably be fit in guide groove 282.

With the above design, the desired adapter having the proper guides 72 and 80 can be selected and used in accordance with the size and shape of a single core fiber in use, so that the cutting apparatus can be applied to optical fibers with different sizes and shapes.

Cutting Apparatus Body 252:

As shown in FIG. 21A, table 22 of clamp 20 and table 64 of clamp 62 are provided on base 92. Set table 94 of a rectangular parallelepiped shape, for example, is provided at the rear side of these tables 22 and 64 and is formed with guide groove 282 on its top.

Lid 254 is openably attached to set table 94 by hinge 256. Reference numeral 292 is a spring. Lid 254 is made to contact set table 94 by the attraction between magnet 260 provided on set table 94 and contact metal 262 provided on lid 254.

Scoring blade 52 is mounted to a block 294 provided on base 92 and is horizontally moved as shown by the arrow 238, thereby scoring the bare fiber. Alternatively, scoring blade may be moved in the arched manner.

Arm 266 is attached to the side of set table 94 substantially horizontally and is vertically swingable. Arm 274 liftable in the direction perpendicular to the axis of arm 266 is attached to the distal end of arm 266, and pushing member 54 is attached to the bottom of the distal end of arm 274. Compression spring 276 is provided between base 92 and arm 266.

When arm 274 is pulled down to push down pushing member 54, bare fiber 44 can be cut.

Figure 6:
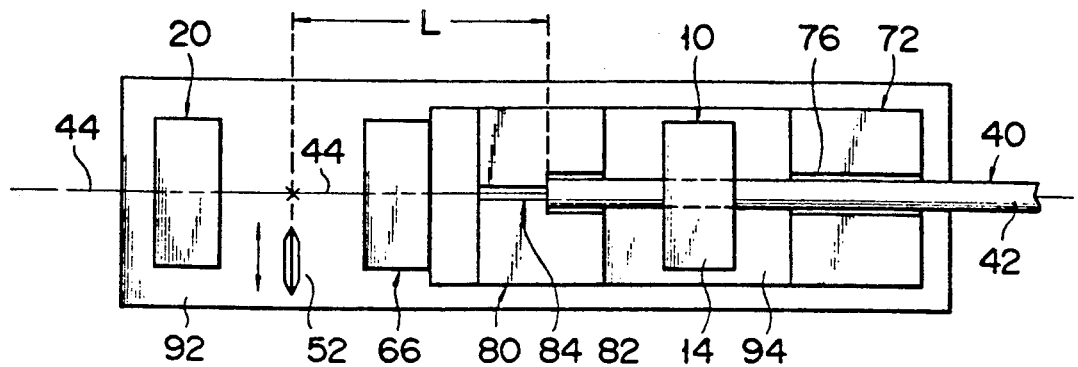
FIG. 6 shows a plan view of the conventional cutting apparatus, somewhat in detail.
Figure 7:
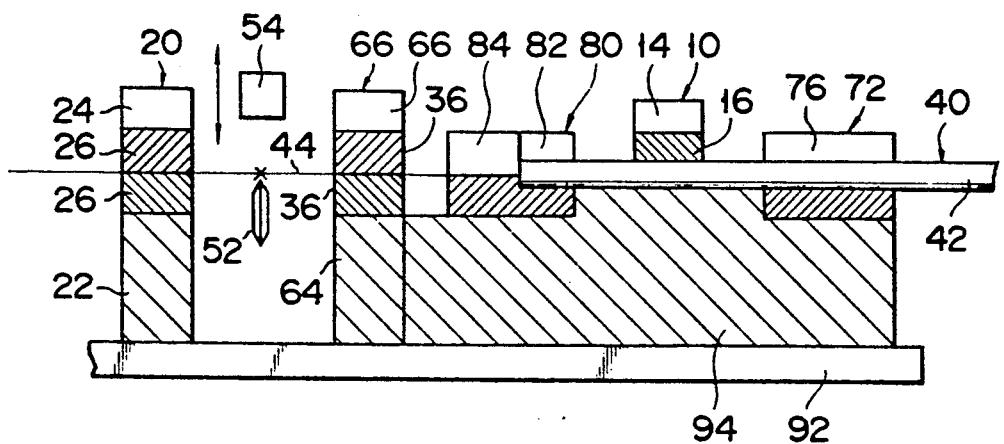
FIG. 7 shows a schematic cross sectional view of the conventional cutting apparatus of FIG. 6, taken along the axis thereof.

Adapter 286A (FIG. 21A):

This adapter is used for a single core fiber whose sheathed portion has a relatively large diameter and a constant cutting length L (corresponding to the case as shown in FIGS. 6 and 7).

The adapter can be used when sheathed portion 42 has a diameter of 0.25-0.9 mm, for instance.

Reference numeral 284 is a plate which has the same size as guide groove 282 and can detachably be fit in the groove 282. Plate 284 has first guide 72 and second guide 80 formed in its top surface.

Figure 22:
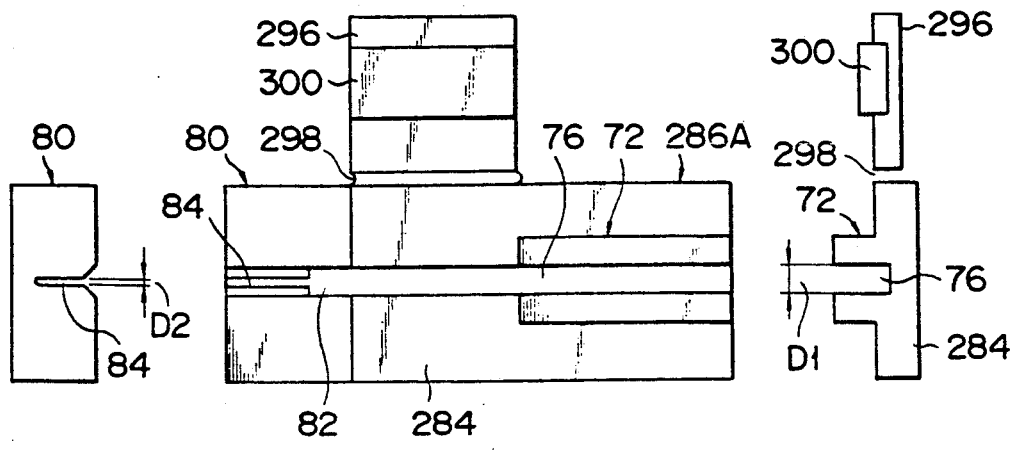
FIG. 22 shows a plan view of the adapter used in the cutting device shown in FIG. 21A, with the lid opened.

Groove 76 of first guide 72 and groove 82 of second guide 80 have a width D1 of 1 mm, and slit 84 of second guide 80 has a width D2 of 0.13 mm (FIG. 22).

Lid 296 is mounted to the side of plate 284 by hinge 298, and pushing rubber 300 is provided on the bottom of lid 296.

Figure 8:
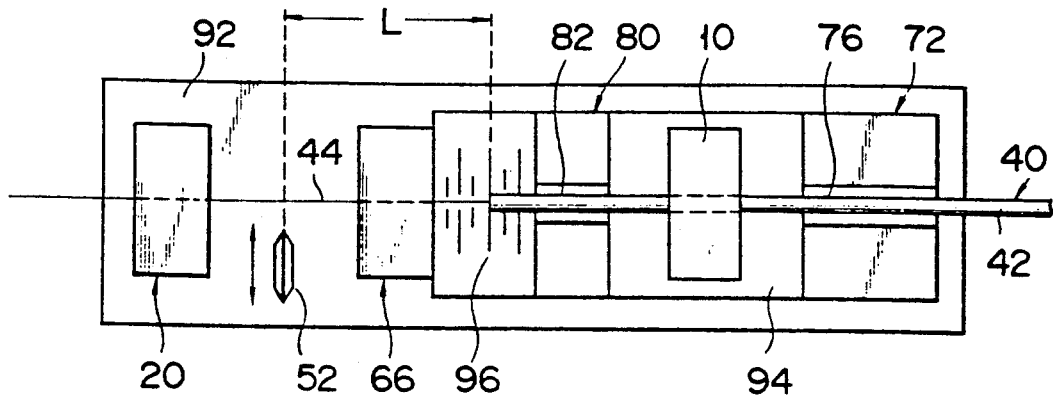
FIGS. 8 and 9 respectively show schematic plan views of other conventional cutting apparatus.
Figure 9:
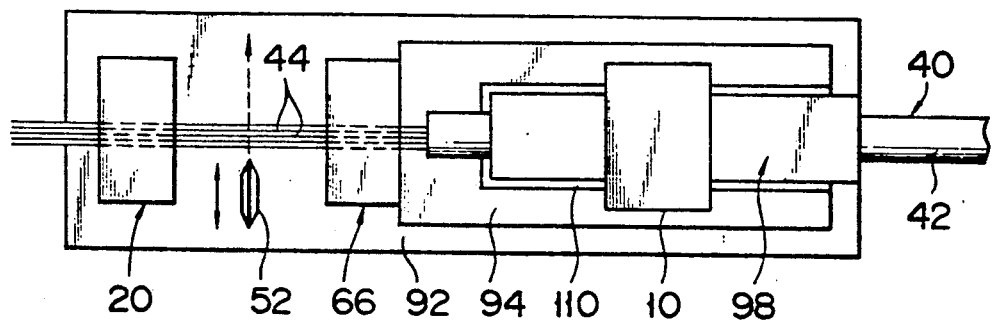
Figure 21B:
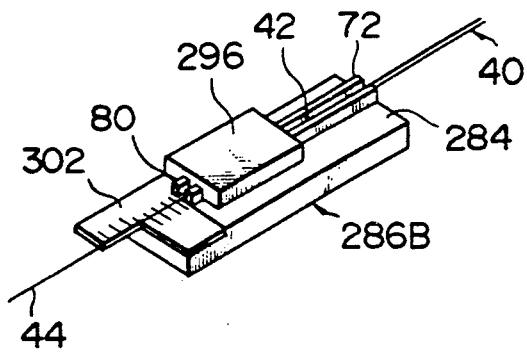
FIGS. 21B and 21C are schematic plan views of adapters for use in the cutting apparatus as shown in FIG. 21A.

Adapter 286B (FIG. 21B):

This adapter is used for a single core fiber whose sheathed portion has a relatively small diameter and a variable cutting length L (corresponding to the case as shown in FIG. 8).

The adapter can be used when sheathed portion 42 has a diameter of 0.25 mm and the cutting length L ranges between 6 to 20 mm, for instance.

Figure 23:
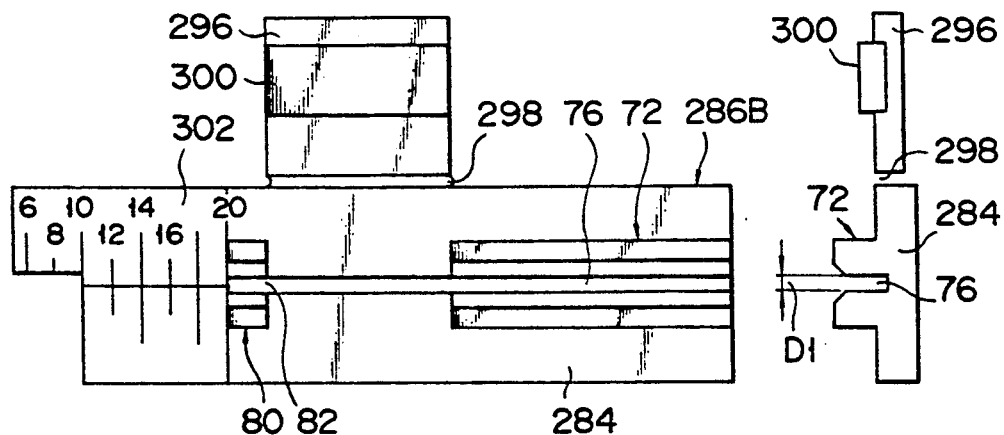
FIG. 23 shows a plan view of the adapter shown in FIG. 21B, with the lid opened.

Groove 76 of first guide 72 and groove 82 of second guide 80 have a width D1 of 0.3 mm (FIG. 23).

In this case, a scale 302 is integrally formed on plate 284.

Operation:

1) Adapter 286A In Use:

Sheathed portion 42 of optical fiber 40 is fit in grooves 76 and 82, bare fiber 44 is fit in slit 84, and lid 296 is closed (the optical fiber is not clamped yet in this state).

Then, adapter 286A is accommodated in guide groove 282 of apparatus body 252. The adapter should not necessarily be fixed to apparatus body 252 but may be fixed thereto by a screw.

When lid 254 of apparatus body 252 is closed, lid 296 of the adapter is pressed by spring 292 provided on lid 254 to securely clamp optical fiber 40.

2) Adapter 286B In Use:

Sheathed portion 42 of optical fiber 40 is fit in grooves 76 and 82, and the end of the sheathed portion 42 is aligned with the figure of the cutting length L on scale 302.

The other procedures are the same as those involved in using adapter 286A.

Figure 24:
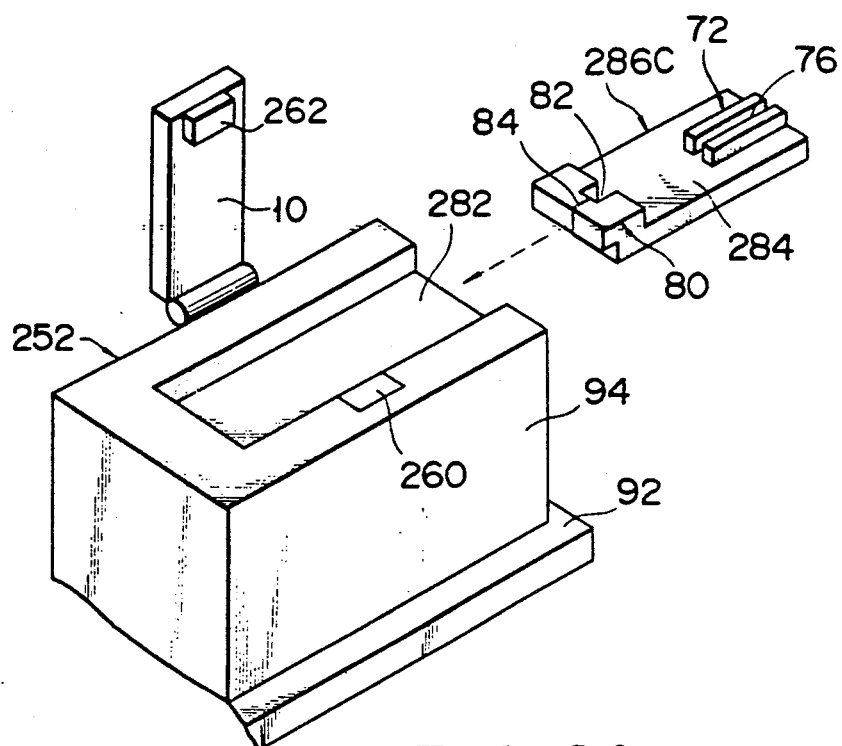
FIG. 24 is a schematic perspective view of an optical fiber cutting apparatus according to a still another embodiment of this invention.

Modifications of the cutting apparatus shown in FIG. 21A:

(1) As shown in FIG. 24, no lid is provided on adapter 286C, and apparatus body 252 is modified. The modified portion is only shown for simplicity of illustration.

Adapter 286C is accommodated in guide groove 282 of apparatus body 252 and is secured thereto by a screw or the like as desired.

Optical fiber 40 is then set on adapter 286C, and first clamp 10 mounted on apparatus body 252 is closed to clamp the fiber by the help of the attraction between magnet 260 provided on first clamp 10 and contact metal 262 provided on set table 94, for example.

Optical fiber 40 may be clamped only by second and third clamps 20 and 62, without using first clamp 10.

Figure 25:
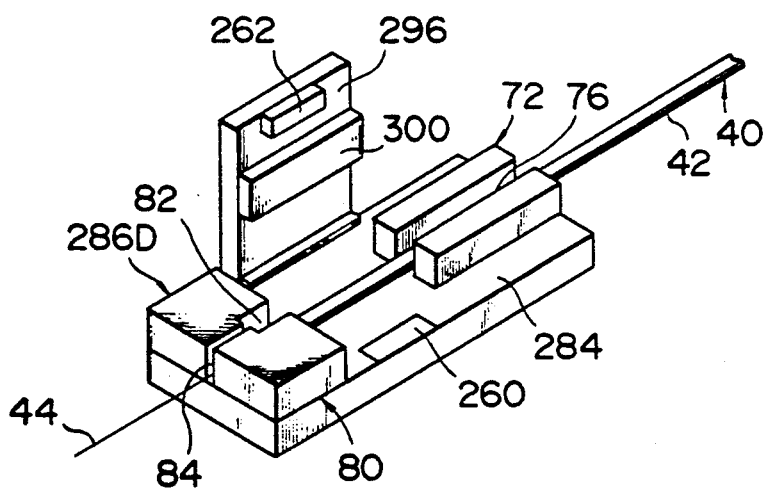
FIG. 25 is a schematic diagram illustrating another adapter.

(2) As shown in FIG. 25, lid 296 of adapter 286D is designed to be able to sandwich optical fiber 40 by the help of the attraction between magnet 260 provided on plate 284 and contact 262 provided on lid 296.

Reference numeral 300 denotes a rubber member used to absorb the stress applied on the optical fiber.

Adapter 286D sandwiching optical fiber 40 is accommodated in guide groove 282 of apparatus body 252 and is fixed by closing first clamp 10.

Optical fiber 40 may be clamped only by second and third clamps 66 and 20, without using first clamp 10.

Figure 21C:
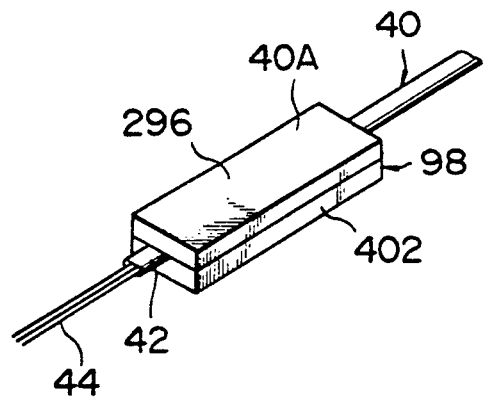

An adapter (FIG. 21C) comprising stationary jig 98 used for a multicore fiber can be applied to the cutting apparatus shown in FIG. 21A, in addition to adapter 286A or 286B used for a single core fiber.

To realize the above, the plate 402 of jig 98 which constitutes the main body of the adapter is designed to have the same size of guide groove 282 of apparatus body 252, i.e., the same size as plate 284 of adapter 286A or 286B.

Figure 26:
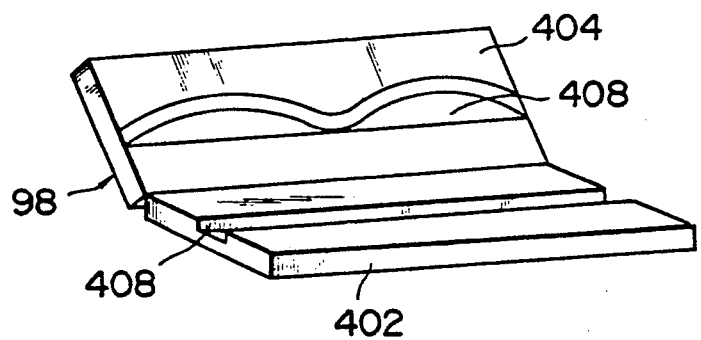
FIG. 26 is a schematic perspective view of the adapter shown in FIG. 21C.

An example of the adapter comprising stationary jig 98 is illustrated in FIG. 26.

Plate 402 has a groove 408 formed to receive optical fiber 40, and a liftable lid 404 is attached to the plate 402. Lid 404 has a rib 408 with a wave shape, as shown in FIG. 26, to restrict the lateral movement of optical fiber 40.

Multicore optical fiber 40 is sandwiched between plate 402 and lid 404 of stationary jig 98 is fit in guid groove 282 of stationary jig 98 and is clamped by first clamp 10.

Operation:

Stationary jig 98 sandwiching optical fiber 40 is fit in guide groove 282 of the cutting apparatus of FIG. 21A and is then pressed by spring 292 by closing lid 254.

In this case, the movement of scoring blade 52 is restricted only to the horizontal direction.

Effects of the embodiments of FIGS. 21A to 26:

(1) A single type of cutting apparatus can be applied to cutting optical fibers of various types and various cutting lengths L by the selective use of the proper adapters.

(2) This can advantageously eliminate the need to provide different cutting apparatuses.

(3) The productional and sales managements of the cutting apparatus of this invention is easy, which will reduce the cost of the apparatus.

What is claimed is:

1. An optical fiber cutting apparatus comprising:
a supporting grooved member for supporting an optical fiber;
a plurality of clamps for clamping said optical fiber supported on said supporting grooved member, each of said clamps comprising a pincher and a table;
a scoring blade, provided between a predetermined two adjacent clamps of said plurality of clamps, for making a score on at least one side of said optical fiber by moving within a plane substantially perpendicular to said optical fiber;
a pushing member for pushing said optical fiber from a side opposite from the side of said score to cut said optical fiber; and
reference marking means provided at a location under said optical fiber to be clamped by said clamps, said marking means comprising at least one straight line extending substantially parallel to a direction in which the optical fiber extends, located beyond said supporting grooved member toward a distal end of said optical fiber, and substantially perpendicular to a moving direction of said scoring blade.

2. The cutting apparatus according to claim 1, wherein one of said predetermined two adjacent clamps clamps a bare fiber portion of said optical fiber and the other one of said predetermined two adjacent clamps clamps a sheathed portion of said optical fiber.

3. The cutting apparatus according to claim 1, wherein both of said predetermined two adjacent clamps clamp a bar fiber portion of said optical fiber.

4. The cutting apparatus according to claim 1, wherein said scoring blade horizontally moves within said plane substantially perpendicular to said optical so as to score said optical fiber.

5. The cutting apparatus according to claim 1, wherein said pinchers of said predetermined two adjacent clamps are attached o a common member so that the pinchers are simultaneously moved when the common member is operated.

6. The cutting apparatus according to claim 1, wherein said pinchers of said plurality of clamps are attached to a common member so that the pinchers are simultaneously moved when the common member is operated.

7. An optical fiber cutting apparatus comprising:
a main body comprising at least three clamps for clamping an optical fiber set straight, each of said at least three clamps including a pincher and a table, said pinchers of said at least three clamps being attached to a common member so that the pinchers are simultaneously moved when the common member is operated, a predetermined two adjacent clamps of said at least three clamps including means for clamping a bare portion of the optical fiber and a remaining one clamp of said at least three clamps including means for clamping a sheathed portion of the optical fiber;
said main body further comprising;
a scoring blade, provided between said predetermined two adjacent clamps of said at least three clamps, for making a score on at least one side of said optical fiber;
a pushing member for pushing said optical fiber from a side opposite from the side of said score to cut said optical fiber;
a base on which said at least three clamps, said scoring blade and said pushing member are provided at predetermined positions; and
a set table provided on a straight alignment line of said at least three clamps on a side of an outermost one of said at least three clamps and having a guide groove formed on a top surface thereof; and
an adapter comprising a plate having first and second guides formed in accordance with a type of an optical fiber to be cut, and detachably fittable in said guide groove of said set table.

8. The cutting apparatus according to claim 7, wherein said scoring blade horizontally moves within said plane substantially perpendicular to said optical fiber so as to score said optical fiber.

* * * * *